Sept. 9, 1941.  F. O. DUNCAN  2,255,701
MOTOR VEHICLE TURN SIGNAL
Filed July 6, 1939  2 Sheets-Sheet 1
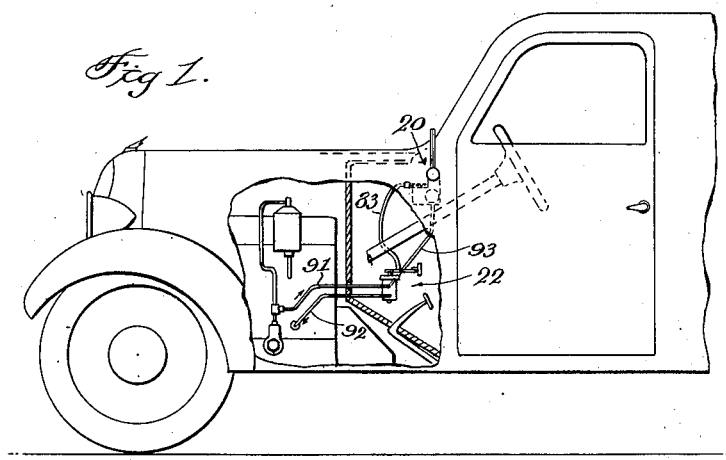
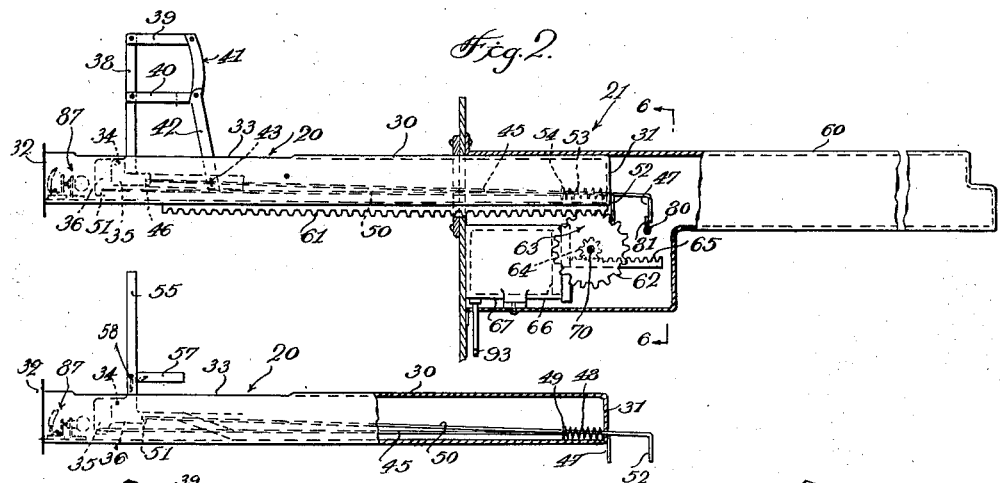
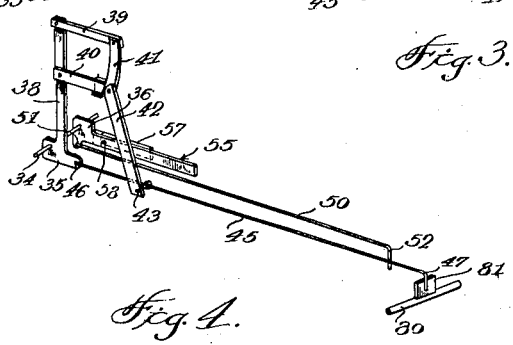
Frank O. Duncan
INVENTOR
BY Victor J. Evans & Co.
ATTORNEYS
WITNESS Sept. 9, 1941.  F. O. DUNCAN  2,255,701
MOTOR VEHICLE TURN SIGNAL
Filed July 6, 1939  2 Sheets-Sheet 2
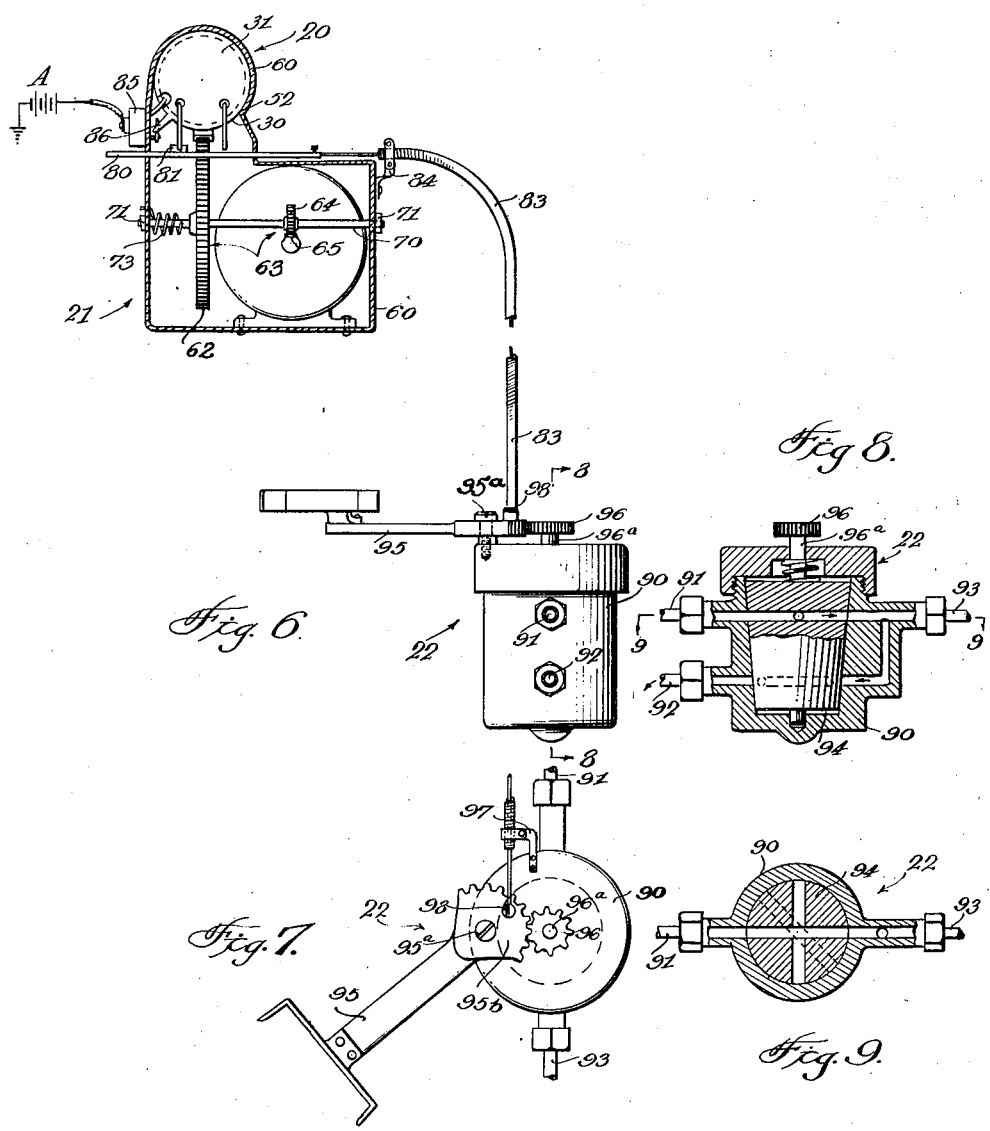
Frank O. Duncan
INVENTOR
BY Victor J. Evans & Co.
ATTORNEYS Patented Sept. 9, 1941

2,255,701

UNITED STATES PATENT OFFICE 2,255,701

MOTOR VEHICLE TURN SIGNAL

Frank O. Duncan, Oklahoma City, Okla.

Application July 6, 1939, Serial No. 283,094

4 Claims. (Cl. 116—39)

This invention relates generally to improvements in signalling devices for vehicles, and more especially to a new and improved extensible mechanical signalling device for indicating externally of the vehicle an intention of the driver to turn the vehicle right or left.

One of the objects of the present invention is to provide a novel signalling device operable from the locality of the driver's seat whereby the driver may cause a signal unit to move outwardly from the vehicle, displaying a signal character indicating an intention of the driver to turn a vehicle right or left.

Another object of the present invention is to provide a hydraulic operable device for, upon occasion, moving a character bearing signal outwardly from a vehicle in a position readily visible to drivers of other vehicles.

Another object of the present invention is to provide a novel signal unit including characters comprising pivotally concatenated elements which when erected simulate in outline alphabetical characters but which, during the operation of the device when lowered into essentially horizontal or at least not erect position, dispose themselves in a compact assembly.

Another object of the present invention is to provide a signalling device including a plurality of erectable signals of the type above mentioned associated with mechanism for permitting selective erection of said signals during operation of the device.

An advantage of the device according to the instant invention is that it provides for the external display of relatively large signal characters which, when not displayed, are compactly stored within portions of the vehicle in space normally unoccupied, this advantage following from use of the collapsible signals of the type hereinabove mentioned.

A noteworthy feature of the device according to this invention is that it can be operated by the driver of the vehicle with which it is associated, by means of a conveniently located foot pedal, the operating means serving both to move the signals into position of display and to select one of a plurality of signals.

Other objects, advantages and features will be apparent to those skilled in this art during the course of the following description.

Regarded in certain of its broader aspects the novel vehicle signalling device according to the instant invention comprising a horizontally sliding casing mounted in a part of a vehicle in a manner such that a casing end portion can be exposed externally of the vehicle; a plurality of selectively erectable signals mounted in end parts of said casing and normally retracted therein but, upon occasion, movable into exposed character-displaying erect position; and means for causing reciprocating sliding motion of said casing and for selectively erecting said signals.

In order to facilitate a fuller and more complete understanding by those skilled in this art of the matter of the instant invention, a specific embodiment thereof herein illustrated will now be described, it being clearly understood, however, that the illustrated embodiment, although the principally preferred embodiment of this invention, is shown and described solely by way of example of the practice of this invention and is not to be construed as a limitation upon the scope thereof except as same is expressed in the subjoined claims read in the light of this specification.

Referring now to the drawings,

Figure 1 is essentially a side elevational view of portions of a vehicle with parts broken away for clearness illustrating the preferred mode of mounting the device according to the instant invention thereon, Fig. 2 is substantially a rear elevational view of the reciprocating signalling carrying casing and part of the operating mechanism therefor forming a portion of the principally preferred embodiment of this invention, certain parts being broken away for clearness of illustration and other parts being shown in vertical sectional view, Fig. 3 is a rear elevational view partially in vertical cross section of a reciprocating casing element according to this invention, one of the signal units being shown in erect exposed position, Fig. 4 is essentially a perspective view of the character forming signal elements showing the presently preferred erecting mechanism, Fig. 5 is a perspective view of one of the signal units, Fig. 6 is essentially a vertical sectional view of Fig. 2 taken along the line 6—6 thereof together with a side elevational view of the signal control mechanism, Fig. 7 is substantially a top plan view of the signal control mechanism, Fig. 8 is a vertical sectional view of the control mechanism illustrated in Fig. 6 taken along the line 8—8, and Fig. 9 is a horizontal sectional view of Fig. 8 taken along the line 9—9.

In the accompanying drawings it will be noted that the novel signalling device according to the present invention comprises a signalling means generally designated by the numeral 20 horizontally slidingly mounted in parts of a vehicle. A mechanism generally designated by the numeral 21 for moving said signalling means 20 into and from extended position and control means generally designated by the numeral 22 for selectively operating a signalling mechanism and controlling sliding motion of the signalling means will hereinafter be more clearly apparent.

The signalling means 20 and ancillary equipment will now be described. It will be noted that the signalling means comprises a tubular casing 30 closed at one end 31 and capped at the other end by the end piece 32. The casing is hollow and essentially circular in cross sectional outline and is provided near the end cap 32 with an elongate slot-like opening 33 formed in the side thereof and opening upwardly. Within the casing 30 and extending transversely thereacross is essentially fixedly mounted a shaft 34 positioned adjacent but beneath the opening 33 and carrying a first lever arm 35 mounted thereon in a manner such that the arm may freely be rotated with respect to the shaft. A second lever arm 36 mounted in similar manner upon the shaft 34 but spaced relative to the arm 35 hereinabove described is provided essentially as shown in Figs. 2, 3 and 4.

The lever arm 35 carries an upright member 38 having pivotally attached thereto horizontally extending character forming elements 39 and 40 connected at the free ends thereof by a vertically extending cross piece 41 likewise pivoted to the elements 39 and 40 and an obliquely extending strip 42 pivoted at one end to the elements 40 and 41 and provided with a slide attachment 43 at the free end thereof. A horizontally extending rod 45 attached at the place 46 to the lever arm 35 and serving as support for the sliding mounting 43 of the strip 42 extends through the casing and projects outwardly therefrom through the casing end 31 presenting a hook formation 47 essentially as indicated in Figs. 2, 3 and 4. It will be apparent that axial motion of the rod 45 in a direction away from the locality of the shaft 34 will cause the lever arm 35 to move from the position it occupies in Fig. 3 to the position depicted in Fig. 2. In other words, the portion 38 of the lever arm will move from horizontal to essentially vertical position as a result of said movement of the rod 45. It is to be noted that when the portion 38 of the lever arm 35 is in an essentially horizontal position, the character forming elements 39, 40, 41 and 42 are disposed in collapsed, compact, essentially horizontal position as shown in Fig. 3. The portion 38 of the lever arm 35 is maintained in essentially horizontal position except under certain circumstances which will hereinafter be described by means including spring-like means 48 abutting against the casing end 31 and the collar 49 mounted on the rod 45 whereby the rod is pressed in a direction toward the locality of the shaft 34.

In like manner the lever arm 36 is provided with an actuating rod 50 connected to the lever at the place 51 extending axially through the casing and projecting through the casing end 31 to present a hook formation 52 substantially as shown in Figs. 3, 4 and 6. Spring pressing means 53 abutting against the casing end 31 and the collar 54 mounted on the rod 50 serve normally to position the portion 55 of the lever arm 36 in essentially horizontal position. When, however, the rod 52 is moved axially within the casing in a direction away from the locality of the shaft 34, the portion 55 of the lever 36 is moved into essentially vertical position as depicted in Fig. 3. A horizontally extending character forming element 57 pivoted at the place 58 to the portion 55 of the lever arm 36 is pressed into horizontal position by the coil spring 59 whereby, when the portion 55 of the lever arm 36 is moved to essentially upright position, the parts dispose themselves into the relative positions shown in Figs. 3 and 5. It of course will be understood that when the portion 55 of the lever arm 36 is moved into essentially horizontal position, the character forming element 57 moves into position next the lever arm essentially as shown in Fig. 4.

It will be evident that when the hook formation 47 of the rod 45 is moved outwardly from the casing, the lever arm 35 and associated assembly moves into upright position whereby a signal having an outline not dissimilar from an R is displayed and likewise manipulation of the hook formation 52 of the rod 50 causes the lever arm 36 to be actuated in a manner whereby the signal displayed in outline resembles an L. In the presently preferred embodiment of the instant invention the signal characters correspond to the right and left turn respectively.

The signal means 20 hereinabove described is horizontally slidingly mounted on parts of the vehicle and both the presently preferred mode of mounting the signalling means and the mechanism for imparting horizontal sliding motion thereto will now be described, reference being made especially to Figs. 2 and 6. The casing 30 receivable within the housing 60 is provided on the bottom thereof with a first tooth rack 61 engaging with the teeth 62 of a differential gear system 63, the other gear 64 of said system engaging with a second tooth rack 65 axially extending from and attached to a sliding piston 66 mounted within a chamber 67 essentially as shown in Figs. 2 and 6. Referring especially to Fig. 6, it is to be noted that the shaft 70 upon which the differential gear system 63 is mounted is journalled in bearings 71 in side portions of the housing 60 and is provided with torque sensitive resilient means 73 engaging with parts of the housing and with the shaft 70 whereby motion of said shaft in a clockwise direction as viewed in Fig. 2 is urged thereby causing the signalling means 20 to be moved into retracted position within the housing 60.

It will be apparent, however, from consideration of the drawings and the hereinabove description of the structure of the illustrated device, motion of the piston 66 within the chamber 67 toward the position illustrated in Fig. 2 will result in accelerated sliding motion of the signalling means into outwardly extending exposed position as illustrated in said figure. The manner of selectively operating the signals hereinabove described during sliding motion of the signalling means will now be described, reference being made especially to Figs. 2 and 6 wherein the numeral 80 designates the sliding member carrying a catch 81 engaging, upon occasion, with either one of the hook formations 47 and 52 hereinabove mentioned whereby, as the signalling means 20 slides into outwardly extended position, the catch blocks the travel of one of the hook formations thereby moving the corresponding rod relative to the casing 30 and causing erection of the associated signal. The sliding member 80 is preferably actuated by means of a Bowden wire connector 83 attached to the housing 60 by the supporting bracket 84. A switch 85 mounted in a part of the housing 60 and actuable by means of the arm 86 carried upon the casing end 31 serves periodically to connect the illuminating means 87 carried in the end portion of the casing 30 with an appropriate power source such as a battery A, whereby, when the signalling means is moved to outwardly extended position, the illuminating means serves to attract attention to the signal.

Means generally designated by the numeral 22 for controlling and operating the signalling device above referred to will now be described, reference being made especially to Figs. 6 to 9 inclusive, wherein the numeral 90 designates a three-position valve connected to a source of pressure fluid such as the hydraulic brake pump of a vehicle by means of the line 91 and connected to a drin by the line 92 and by the line 93 to the interior of the chamber 67 hereinabove described. Openings are formed in the rotor 94 of the valve 90 whereby, for two extreme positions during rotation of the rotor, the feed line 91 from the source of fluid supply is connected to the line 93 communicating with the interior of the chamber 67 whereby fluid passing into said chamber causes the piston 66 to move within the chamber to the position shown in Fig. 2, but when the rotor 94 of the valve 90 is in an intermediate position the line 93 is connected to the line 92 whereby fluid passes from the chamber 67 to the drain, due to action of the torque pressing means 73 acting as hereinabove described.

Rotation of the rotor 94 is produced preferably by a foot lever 95 mounted on the pivot 95a and provided with a toothed end portion 95b engaging with a gear 96 mounted on the rotor shaft 96a. It will be evident that swinging motion of the foot lever 95 will cause rotation of the rotor with concomitant connection and disconnection of the feed lines and drain lines as hereinabove described. An end portion of the Bowden wire connector 83 supported on parts of the valve 90 by the standard 97 is connected to the pivot 98 carried on a portion of the toothed end part 95b of the foot lever 95 whereby motion of the foot lever to actuate the rotor 94 as aforesaid causes sliding motion of the member 80 to move the catch 81 into engagement with one or the other of the hook formations 47 and 52 of the signalling means.

Having thus described the structure of the presently preferred embodiment of the instant invention, its mode of operation next will be described. When the operator of the vehicle wishes to signify an intention to turn, for example, to the right, the foot lever 95 is moved to the extreme right position whereby the sliding member 80 is moved to cause engagement of the catch 81 with the hook formation 47 of the rod 45 and in so moving the foot lever 95, the rotor 94 is rotated causing connection to be established between the feed line 91 associated with the source of fluid supply and the line 93 communicating with the interior of the chamber 67. In this manner fluid passes from the source of fluid supply to the interior of the chamber moving the piston to the extreme position therein illustrated in Fig. 2 whereby the signalling means 20 is moved outwardly into extended position and upon engagement of the hook formation 47 with the catch 81 the lever arm 38 is actuated, causing erection of the "R" signal. In like manner movement of the foot pedal 95 to extreme left position causes erection of the "L" signal. It will of course be recalled that the illuminating means 87 functions when the signalling means moves to extended position for illuminating the erected signal. Movement of the foot pedal 95 to an intermediate position causes the line 93 to be connected to the drain line 92 and, as the piston 66 moves backwardly within the chamber 67, the "R" or "L" signal is moved from erected to lowered position and the signalling means generally designated by the numeral 20 is moved to retracted position within the housing 60.

Having thus described the present invention, what it is desired to secure by Letters Patent is:

1. A vehicle signalling device comprising a casing horizontally slidingly mounted in parts of a vehicle in a manner whereby, during sliding thereof, an end portion of the casing may be moved into exposed position projecting from the vehicle side; a plurality of selectively erectable signals, mounted on and normally retracted within parts of said casing but upon occasion, movable into exposed erect character-displaying position, means for holding said signals in retracted position within said casing; and means for imparting sliding motion to said casing comprising a hydraulically actuated reciprocable piston, an axially extending first toothed rack mounted on said piston, a differential gear engaging with said first rack and a second tooth rack, engaging with said gear, mounted on parts of said casing whereby relatively small movement of said piston results in relatively large movement of said casing.

2. A vehicle signalling device, comprising a relatively elongated hollow cylindrical casing horizontally slidably mounted in parts of a vehicle in a manner whereby, during sliding thereof, an end portion of the casing may be moved into exposed position projecting from the side of the vehicle, a plurality of selectively erectable signals, mounted on and normally retracted within parts of said casing, upon occasion, movable into exposed erect character displaying position, each of said signals comprising a freely pivoted arm, a plurality of strip elements pivotally connected together and at least one of said elements connected to the arm and co-operating therewith, whereby, when said arm is erected, a visible character is displayed, but when said arm is not erected the strip element, or elements, fold to a compact essentially horizontally disposed assembly, means for holding said signals in retracted position within said casing and comprising sliding rods, one pivoted at each of said arms, spring pressed towards the signals, each having a hook formation on a projecting free end thereof, and means for selectively causing each of said signals to be moved into erected position, said means comprising a catch sliding beneath and in a direction substantially at right angles to the axis of motion of said casing, engaging any single selected hook formations on the projected free ends of said sliding rods.

3. A vehicle signalling device, comprising a casing horizontally slidably mounted in parts of a vehicle in a manner whereby, during sliding thereof, an end portion of the casing may be moved into exposed position projecting from the side of the vehicle, a plurality of selectively erectable signals, mounted on and normally retracted in parts of the casing, but, upon occasion, movable into exposed erect character displaying position, each of the signals comprising a freely pivoted arm, a plurality of strip elements pivotally connected together, at least one of which is connected to one of the arms, a strip pivotally connected to the other arm, whereby, when either of said arms is erected, a visual character is displayed, but when the other arm is not eercted, the strip element, or elements, fold to a compact essentially horizontally disposed assembly, and means for holding the signals in retracted positions within the casing, comprising sliding rods, one pivoted to each of the arms and spring pressed towards the signal, each having a hook formation on a free end thereof.

4. A vehicle signalling device, comprising a swinging signal, a reciprocating arm for said signal, a hydraulic cylinder, a supply for the cylinder, a piston and piston rod within the cylinder, an axially extended tooth rack mounted on the piston rod, a differential gear engaging said rack, a second tooth rack engaging said gears and mounted on parts of the signal support, whereby relatively small movement of said piston results in relatively large movement of the signal support, a three positioned valve connected with the supply of the cylinder when the source of supply is under pressure and when the valve is in either extreme position and with a fluid drain when the valve is in intermediate position, a foot lever controlling said valve, a Bowden drive for moving the signal into different signal operating positions corresponding to the extreme valve positions, means for driving said Bowden drive, and spring tensioning means connected to said differential gear for returning the signal to retracted position.

FRANK O. DUNCAN.